Aug. 19, 1924.
O. MELIN ET AL
1,505,909
HYDRAULIC POWER PLANT
Filed Jan. 15, 1923   2 Sheets-Sheet 1
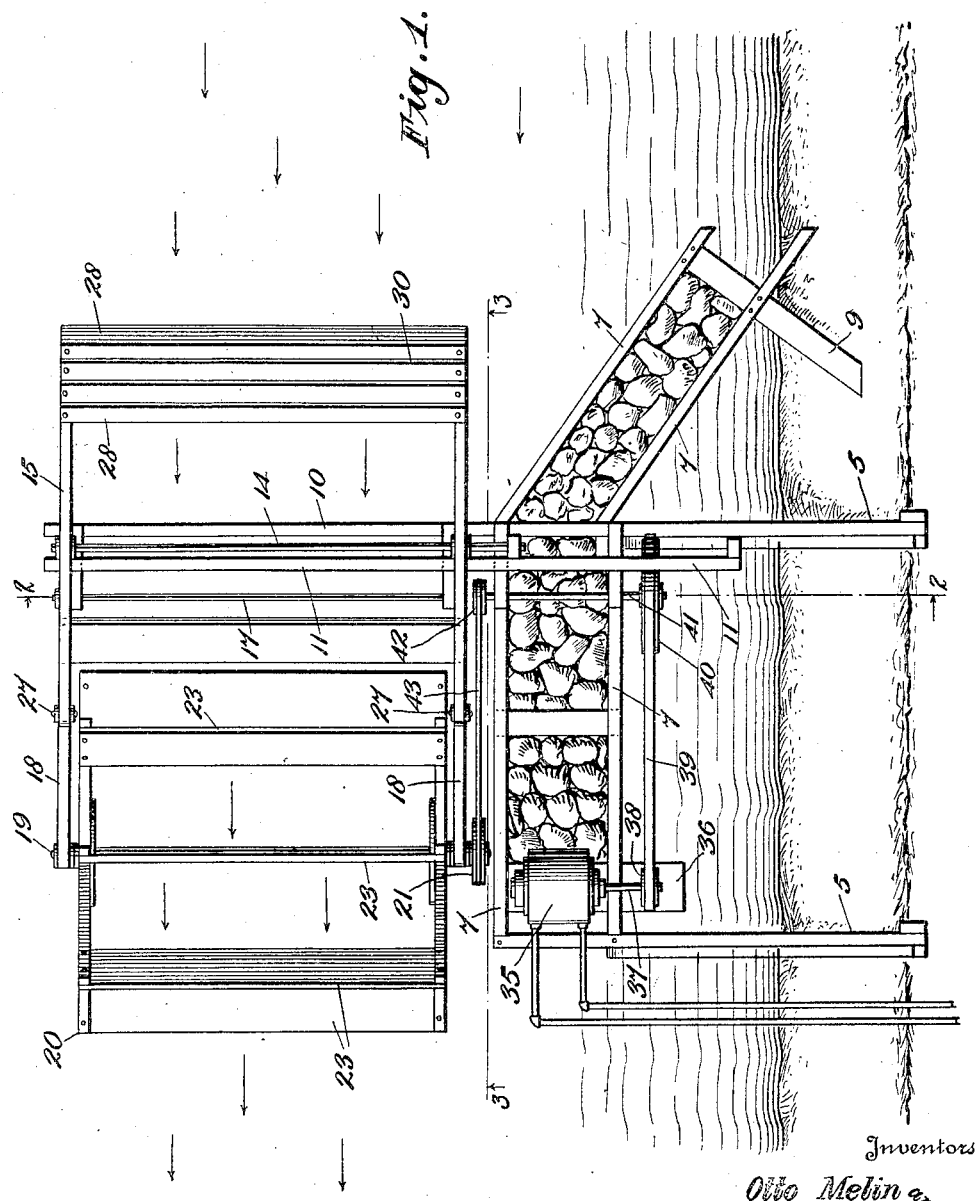
Inventors
Otto Melin and
C. M. Melin
By Wilkinson & Giusta
Attorneys Aug. 19, 1924.
O. MELIN ET AL
1,505,909
HYDRAULIC POWER PLANT
Filed Jan. 15, 1923    2 Sheets-Sheet 2
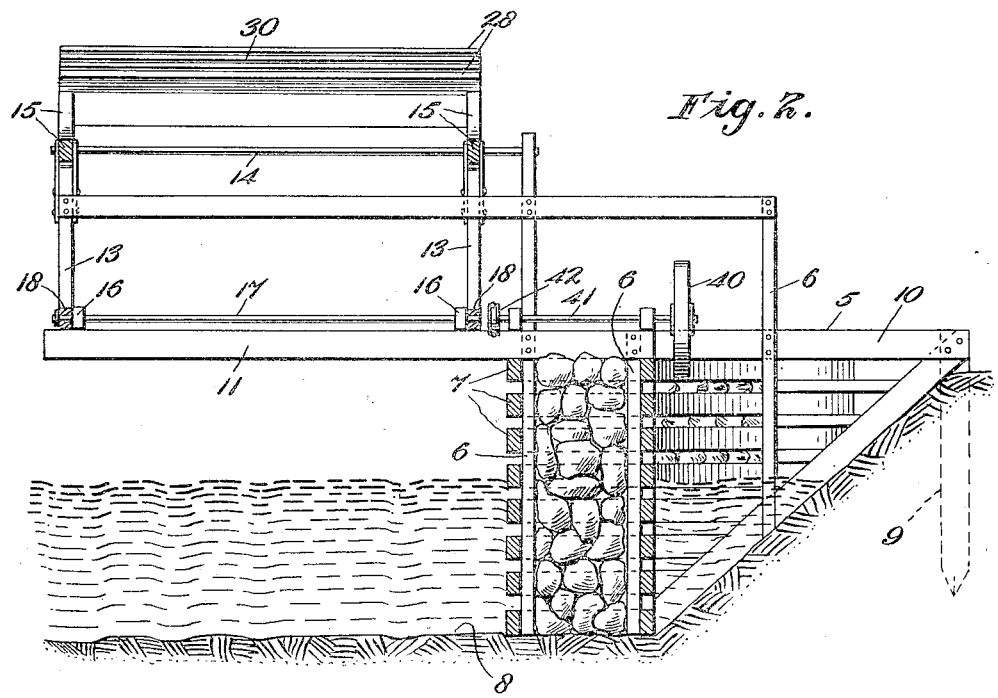
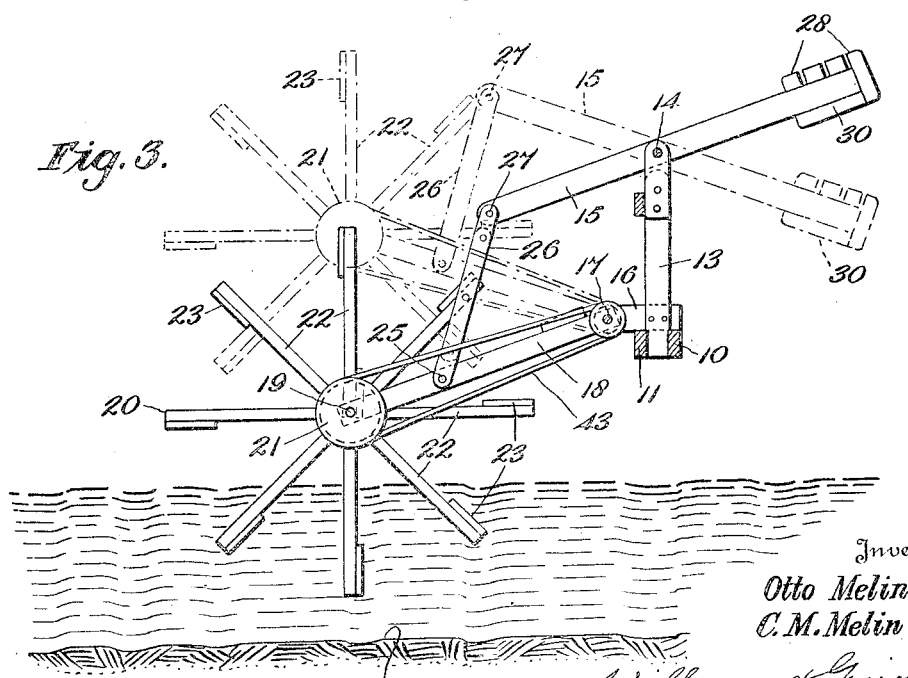
Inventors
Otto Melin and
C. M. Melin
By Wilkinson & Fiista
Attorneys Patented Aug. 19, 1924.

1,505,909

UNITED STATES PATENT OFFICE.

OTTO MELIN AND CLARENCE M. MELIN, OF EMIGRANT, MONTANA, ASSIGNORS OF ONE-THIRD TO A. W. T. ANDERSON, OF EMIGRANT, MONTANA.

HYDRAULIC-POWER PLANT.

Application filed January 15, 1923. Serial No. 612,767.

*To all whom it may concern:*

Be it known that we, OTTO MELIN and CLARENCE M. MELIN, citizens of the United States, residing at Emigrant, county of Park, and State of Montana, have invented certain new and useful Improvements in Hydraulic-Power Plants, of which the following is a specification.

This invention relates to hydraulic power plants and has for one of its objects to provide a plant of this character which will be smiple in construction, comparatively inexpensive to manufacture, install and maintain, and which will be more efficient in operation than those which have been heretofore proposed.

A further object of the invention is to provide a hydraulic power plant in the form of a fluid current wheel which may be readily installed upon the bank of a stream without the use of skilled labor, and which may furnish power for pumping, electric light plants, and the like at a minimum cost.

A still further object of the invention is to provide a fluid current wheel which may be installed upon the banks of streams in which the height of the water varies either due to the rise and fall of the tide or to variations in the rainfall, and which will automatically compensate itself for such variations in the height of the water.

A still further object of the invention is to provide a water wheel which may be readily partially immersed in the stream or which may be, with equal facility, moved out of engagement with the water when it is desired to shut off the power.

With the above and other objects in view, which will appear as the description proceeds, the invention consists in the novel details of construction and combinations of parts more fully hereinafter disclosed and particularly pointed out in the appended claims.

Referring to the accompanying drawings forming a part of this specification, in which like numerals designate like parts in all the views;

Figure 1 is a plan view of a hydraulic power plant constructed in accordance with the present invention;

Fig. 2 is a transverse sectional view of the parts shown in Fig. 1, taken approximately on the plane indicated by the line 2—2 of the said figure, looking in the direction of the arrows; and, Fig. 3 is a longitudinal sectional elevational view, taken approximately on the plane indicated by the line 3—3 of Fig. 1, illustrating the operative and inoperative positions of the fluid current wheel.

In the said drawings the numeral 5 indicates generally a supporting framework which may comprise the upright members 6 to which are secured the substantially horizontal members 7 forming a hollow frame, the lower portion of which may rest upon the bed 8 of the stream adjacent the shore to which the said frame may be anchored by suitable sticks or posts 9, driven therein. The members 6 and 7 are preferably spaced, as clearly indicated in Figs. 1 and 2, and the space between them may be filled with rocks, crushed stone, cement, or earth, in order to firmly maintain the frame in its desired position.

A pair of horizontally extending beams or girders, 10 and 11, are secured to the upper portion of the frame and are of such lengths as to project out over the edge of the said frame suitable distances to constitute a support for the fluid current wheel frame, as will be clear from the drawings. A pair of upright standards 13 are rigidly secured to the said beams, 10 and 11, to the upper ends of which are pivotally secured as at 14 the counter-balancing levers 15. Adjacent the said upright standards 13 and secured to the beams, 10 and 11, there is provided a pair of relatively short horizontally disposed arms 16, to one end of which are pivotally secured, as by the transverse shaft or rod 17, one end of the wheel supporting arms 18. The other ends of the said arms 18 are provided with suitable journals in which is rotatably mounted the wheel supporting shaft 19, carrying the fluid current wheel 20, as well as the main power pulley or other power transmitting device 21.

The said fluid current wheel may be of any desired construction, but is here shown as comprising two spaced spider members provided with the radial arms 22 which carry at their outer ends the transverse connecting paddle members 23. The said paddle members 23 and a portion of the arms 22 are adapted to be immersed in the water of the stream which, as it flows, will act on the said paddles 23 to produce rotation of the wheel in the well known manner.

Pivotally connected to the wheel arms 18, intermediate their ends, as indicated at 25, is a pair of link members 26, the other ends of which are pivotally connected as at 27 to one end of the counter-balancing levers 15, above mentioned. The other ends of the said counter-balancing levers are connected together by suitable transverse members 28, forming a box-like structure or receptacle, which is adapted to receive suitable weights to counter-balance the weight of the wheel 20 and its arms 18. The weights supplied to the said weight receiving receptacle 30 may be sufficient to exactly counter-balance the weight of the wheel and its frame in air, but they are preferably so chosen as to substantially counter-balance the weight of the said wheel and frame when the wheel is partially immersed in water so that the buoyant effect of the water upon the wheel may be utilized to partially counteract the weight of the wheel.

It thus results when the weights are so chosen that should the water level rise or fall, the buoyant effect of the water will change, thus destroying the counterbalance so as to cause the wheel to either rise or fall in accordance with the rise and fall of the water, until the counterbalance is re-established. An automatically acting wheel is thus provided which will compensate for variations in the water level and maintain itself immersed to a predetermined degree at all times, regardless of the height of the water in the stream.

The hydraulic plant thus provided may, of course, be utilized for supplying power for any desired purpose, and as one example thereof we have shown a rotary pump 35, suitably supported upon a base 36, secured to the framework 5. The said pump is provided with the usual shaft 37, carrying the pulley 38, around which passes a belt 39, which is driven from the pulley 40, carried by a counter-shaft 41, suitably journalled in the frame 5, preferably in axial alignment with the pivot rod or shaft 17 of the wheel arms 18. The said counter-shaft 41 is also provided with a pulley 42 engaged by a belt 43, which also passes around the main power pulley 21 carried by the wheel shaft 19. Power may thus be transmitted from the said wheel shaft and by varying the sizes of the pulleys employed the speed of the driven member may be increased or reduced, as may be desired.

By mounting the counter-shaft 41 in axial alignment with the pivot rod 17, the wheel 20, together with its shaft 19 and pulley 21, may rise and fall, in accordance with the rise and fall of the water, without disturbing the belt or other power connections 43, since the distance between the pulleys 21 and 42 will always remain the same, regardless of the position of the wheel. It thus results that the belt 43 will always be maintained at the proper tension, without the use of belt tighteners, to transmit the power from the pulley 21 to the pulley 42, with the maximum efficiency.

Of course, any other desired machinery may be substituted for the pump 35, as above intimated, and may be driven by the fluid current wheel in the same manner as that above disclosed.

Should it be desired to shut off the power developed by the wheel 20, it is only necessary to raise the wheel out of the water by bearing down upon the weighted ends of the counter-balancing levers 15, until the said wheel is completely withdrawn, and it may be maintained in such position in any suitable manner, as for example by ropes or by suitable catches or latches. The raising of the wheel will be relatively easy, due to the fact that its weight is substantially counter-balanced by the weights in the receptacle 30, as above disclosed.

It will thus be seen that this invention provides a fluid current power mechanism comprising a wheel which is so mounted that it will automatically rise and fall in response to the rise and fall of the water level in the stream, whether that be occasioned by rainfall or by the ebb and flow of the tide. Furthermore, due to the fact that the wheel is thus pivotally mounted, should driftwood or other floating objects encounter the wheel, no harm will result, since the wheel will merely rise over such floating objects to clear the same and permit them to continue their course down stream. In addition to the above the power may be readily and effectively shut off by merely raising the wheel out of the water and securing it in its raised position as was above disclosed.

While one form of the invention has been illustrated and described it is obvious that those skilled in the art may vary the details of construction as well as the arrangement of parts without departing from the spirit of the invention, and therefore it is not wished to be limited to the above disclosure except as may be required by the accompanying claims.

What is claimed is:

1. A hydraulic power plant comprising a frame-work fixed at the side of a stream, supports extending out from the framework over the water, arms pivotally carried from said supports, a water wheel rotatably mounted in the free ends of said arms, said arms adapted to extend downwardly from their pivot points when the water wheel is in operative position in the stream, uprights upon said supports adjacent the pivotal ends of the arms, a lever fulcrumed upon said supports and adapted to carry weights at its outer end, the inner end portion of the lever extending above and overlapping the said arms, links pivoted to the inner end of the lever and in intermediate portion of the arms, and means for taking off power from said water wheel.

2. A hydraulic power plant comprising a frame-work fixed at the side of a stream, supports extending out from the frame-work over the water, arms pivotally carried from said supports, a water wheel rotatably mounted in the free ends of said arms, said arms adapted to extend downwardly from their pivot points when the water wheel is in operative position in the stream, uprights upon said supports adjacent the pivotal ends of the arms, a lever fulcrumed upon said supports and adapted to carry weights at its outer end, the inner end portion of the lever extending above and overlapping the said arms, links pivoted to the inner end of the lever and an intermediate portion of the arms, and means for taking off power from said water wheel, a pulley rotating with said water wheel, a shaft journalled upon the frame-work in substantially axial alinement with the pivot points of said arms, a pulley upon said shaft in substantially the same plane with the first mentioned pulley, a belt extending about said pulleys, and means for applying power from said shaft to the work.

OTTO MELIN.
CLARENCE M. MELIN.